United States Patent [19]

Petersen et al.

[11] E Re. 29,109

[45] Reissued Jan. 11, 1977

[54] APPARATUS FOR THE DETERMINATION OF INTERNAL COMBUSTION ENGINE COMPRESSION PRESSURE

[75] Inventors: Hans-Gunther Petersen, Parkridge, N.J.; Heiko Requardt, Gifhorn, Germany

[73] Assignee: Volkswagenwerk Aktiengesellschaft, Wolfsburg, Germany

[22] Filed: June 7, 1974

[21] Appl. No.: 477,346

Related U.S. Patent Documents

Reissue of:

[64] Patent No.: 3,713,331
Issued: Jan. 30, 1973
Appl. No.: 116,957
Filed: Feb. 19, 1971

[30] Foreign Application Priority Data

Feb. 20, 1970 Germany ..... 2007806

[52] U.S. Cl. ..... 73/117.2
[51] Int. Cl.[2] ..... G01M 15/00
[58] Field of Search ..... 73/116, 117.2; 235/150.2

[56] References Cited

UNITED STATES PATENTS 2,639,859 5/1953 Serrell ..... 340/173 R
3,421,367 1/1969 Mears et al. ..... 73/116

*Primary Examiner*—Jerry W. Myracle
*Attorney, Agent, or Firm*—Watson, Cole, Grindle & Watson

[57] ABSTRACT

The compression pressure of each of the cylinders in an internal combustion engine is represented by a voltage obtained at a tap on the ground cable of the engine and stored in a respective accumulator by control outputs from a shift register which successively activates each of the accumulators to receive the data associated with the starting current of each cylinder. The input to the shift register is fed from the output of a NAND gate having inputs representing the impulses from all the cylinders, the impulses from a cylinder selected as a synchronizing or coordinating cylinder, a main control signal, and a signal from the output of the last accumulator.

10 Claims, 1 Drawing Figure

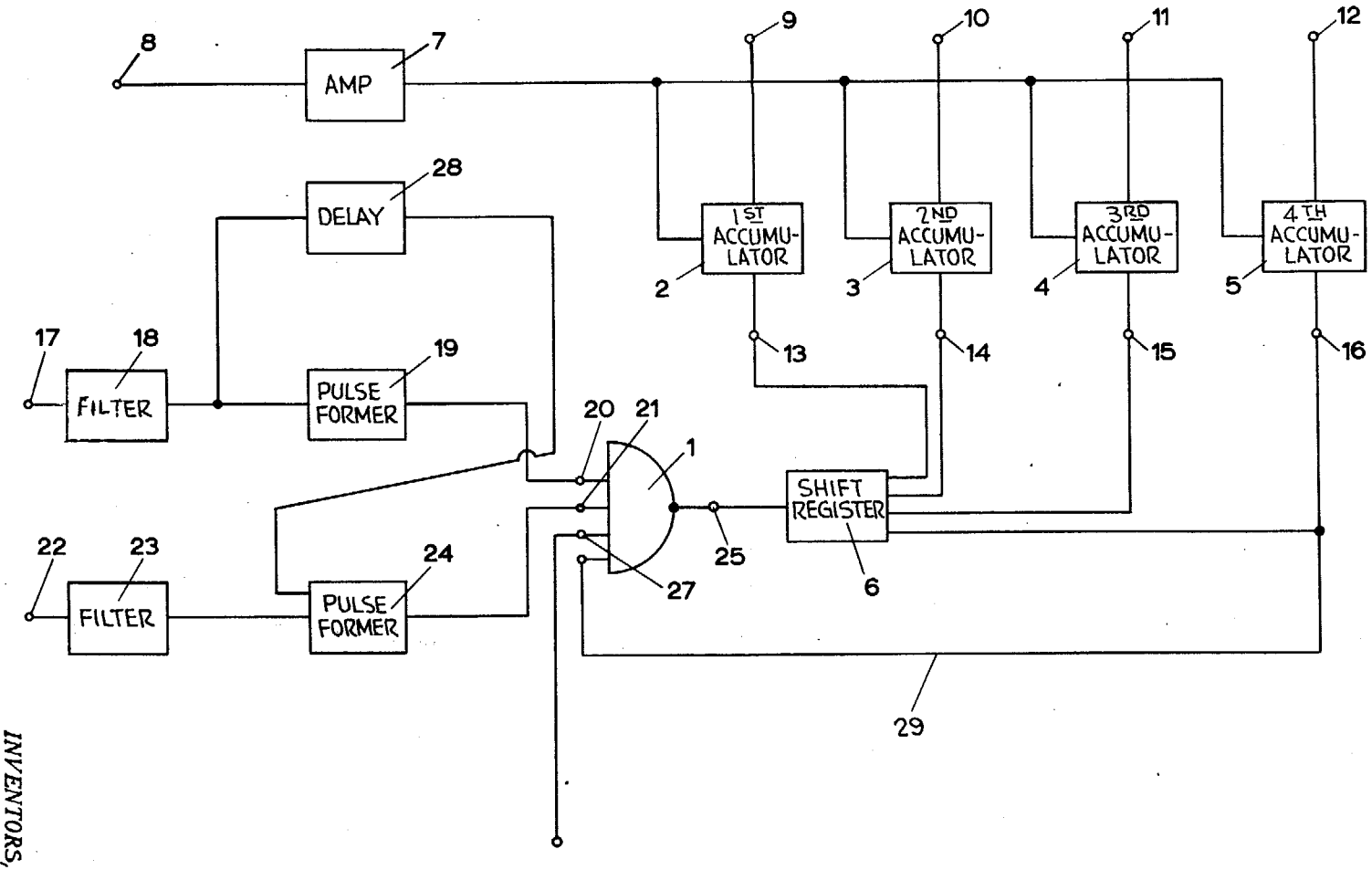
INVENTORS,
HANS-GUNTHER PETERSEN
HEIKO REQUARDT
BY Watson, Cole, Grindle & Watson
ATTORNEYS

APPARATUS FOR THE DETERMINATION OF INTERNAL COMBUSTION ENGINE COMPRESSION PRESSURE

Matter enclosed in heavy brackets [ ] appears in the original patent but forms no part of this reissue specification; matter printed in italics indicates the additions made by reissue.

The invention relates to a process and apparatus for the determination of the compression pressure of internal combustion engines equipped with a starter. The embodiment described herein is directed to internal combustion engines for motor vehicles, but the invention can be also used in the case of stationary engines. Under some uncontrolled conditions only a qualitative determination of the compression pressure will be possible; if, however, the measurement is taken at a given engine temperature, then it is possible to obtain reproducible values and a quantitative measurement is possible.

The process according to the invention, which permits the determination of the compression pressure without removing the spark plug, is characterized in that the strength of the starting current, or a value related to it, is utilized as a measure of the compression pressure by storing such values for each cylinder of the engine. The invention is based on the realization that, since the torque produced by the starter is a function of the starting current and proportional to the compression pressure, there also exists an unequivocal relationship between the starting current and the compression pressure in each of the combustion chambers.

The timing or synchronizing control for the storage of the data may be obtained from the starting impulses of the engine. This will be explained in detail in the following description of an embodiment for performing the process according to the invention.

In a preferred embodiment, the strength of the starting current is determined as the voltage drop on a ground line of the starting voltage source. This ground connection may comprise a relatively low ohmic resistance; however, it is also possible to utilize the resistance of the ground connection itself, which usually is made of copper mesh or some other good conductive material as normally found in motor vehicles.

The timing or synchronization control of the data storage comprises signals corresponding to the starting impulses of all cylinders of the engine which impulses are fed to the input of a gate circuit. Impulses corresponding to a selected cylinder are also fed to another input of the gate circuit so that the gate circuit generates control signals to successively feed data from each cylinder only when the impulse and data of a given cylinder are simultaneously present at the gate input. Coordinating signals are therefor obtained in a particularly simple manner, which signals will serve to assure an unequivocal coordination between the individual stored values on the one hand and the pertinent cylinders on the other hand. As a rule, the first cylinder of an engine is used to provide the coordinating signals. At least the signals corresponding to the starting impulses of the coordinating cylinder are taken from its ignition cable by means of a capacitive or inductive transmitter known per se. Otherwise the starting impulses of each cylinder can be obtained from the electric installation of the engine, such as the distributor, for example.

Specifically, the gate circuit contains a NAND gate, to the input of which signals of a predetermined duration are released by the starting impulses of the coordinating cylinder. The output of the NAND gate controls a shift register. The NAND gate will have a signal output only when there are signals present simultaneously at all its inputs. It must be opened for such a length of time equivalent to an entire operating cycle of the engine to enable data from all the cylinders to be passed to storage. This may be effected by an appropriate feedback signal from the data storage accumulator to the input of the gate. A holding circuit triggered by the signals corresponding to the [starting] *ignition* impulses of the coordinating cylinder, is connected in series with the input of the NAND gate to control that gate to provide quantitative compression data for a complete [starting] *ignition* cycle of the engine cylinders. This holding circuit may simply consist of a mono-stable sweep stage with synchronized timing. A reliable level of the compression pressure, and thus a reliable measurement of the characteristics and the operational state of the engine, can be obtained only after an initial delay period during which the engine is cranked. Therefore, it may be practical to provide a delay circuit which will make possible the release of the storing arrangement only after a sufficient delay required for the stabilization of the engine compression pressures to stabilize.

The storage device contains one accumulator for each engine cylinder and each accumulator input receives the ignition current, or a value related to it, for example, the voltage drop at the ground line. Each accumulator is controlled by the output of a shift register; the input of the shift register is connected to the output of the NAND gate circuit. The shift register, in response to the arrival of the control signals transmitted by the gate circuit, will open the individual accumulators at the required time in the cycle for the storage of the signals from each cylinder.

The aforedescribed embodiment may be modified to provide a connection between the control input of the accumulator triggered last in the cycle and an input of the NAND gate circuit to obtain a signal for closing the NAND gate circuit. This assures that only compression pressures are stored in the accumulators which occur in one operating cycle of the engine.

It is a primary object of the invention to provide both an improved method and an apparatus for determining the compression of the individual cylinders in an internal combustion engine.

Another object of the invention is to provide an improved method and apparatus for measuring the compression of an internal combustion engine without removing the spark plugs from the cylinders thereof.

It is yet a further object of the invention to provide both an improved method and apparatus for determining compression of an internal combustion engine which is simple and yet provides reproducible results so that quantitative measurements may be obtained.

Both the method and apparatus will be readily understood in view of the following description taken in conjunction with the FIGURE which illustrates the necessary circuitry for carrying out the invention.

With reference to the FIGURE, signals corresponding to the [starting] *ignition* impulses from all of the cylinders of the engine appear at terminal 17 and these signals are fed to input 20 of NAND gate 1 via low pass filter 18, which suppresses spurious signals, and impulse former 19 which generates a spiked pulse at its output. Input 21 receives impulse signals from the coordinating cylinder which are similarly filtered by filter 23 and the impulse is shaped by shaping circuit 24. Terminal 22 may be connected by means of an inductive or capacitive pick-up to the ignition cable of the coordinating cylinder, for example, the first cylinder of the engine. A main control signal, such as a start signal, is provided to input 27 of NAND gate 1. The NAND gate also receives a signal fed back *along line 29* from accumulator 5. Delay circuit 28 delays the initiation of the operation of NAND gate 1 for a period of time to enable the engine compression pressure to stabilize, for example, a delay of 4 seconds may be sufficient depending upon the type of engine and other variables. The successive outputs of NAND gate 1, which occur only when all of the input signals are present, are fed to shift register 6 which provides sequential control signals at terminals 13, 14, 15 and 16 to control the operation of accumulators 2, 3, 4 and 5, respectively. Terminal 8 is tapped to the ground of the battery or ignition source and picks up the voltage produced by the starting impulse of each cylinder of the engine. The voltage drops of all the cylinders are successively fed to the inputs of accumulators 2, 3, 4 and 5 through amplifier 7. The contents of accumulators 2, 3, 4 and 5 appear at output terminals 9, 10, 11 and 12, respectively, so that they are available to be used for whatever purposes desired.

The apparatus described above represents an assemblage of known circuit elements which are combined in a very simple manner so as to record the compression pressure of each of the cylinders of an internal combustion engine. It is understood that although the above description is taken in conjunction with the measurement of the compression pressure of a four-cylinder engine, more accumulators could be added to measure the compression with a greater number of cylinders than four. It is also understood that means are known in the art to prevent ignition of the engine cylinders during the compression measurements.

What is claimed is:

[ 1. Apparatus for the determination of the compression pressure in the cylinders of an internal combustion engine equipped with a starter and voltage source, said apparatus having means for generating electrical signals representative of the starting current of said engine, and means for generating coordination signals from at least one of said cylinders, the improvement comprising:

means for storing said electrical signals, means for gating said electrical signals to said means for storing; said means for gating including means for delaying the gating of said electrical signals; said means for gating including a first input for receiving said electrical signals, and a second input for receiving said coordination signals, whereby said electrical signals are transferred to said means for storing only when said means for gating has received said coordination signals and said electrical signals. ]

[ 2. Apparatus as in claim 1 wherein said electrical signals are the voltage drops in the ground line of said voltage source respectively generated by the starting current of each of said cylinders. ]

[ 3. Apparatus as in claim 1 wherein said coordination signals are generated from an electrical connection to the first cylinder of said engine. ]

4. Apparatus as in claim 1 wherein said coordination signals are generated by an inductive or capacitative pick-up from the ignition cable of at least one of said cylinders.

[ 5. Apparatus as in claim 1 wherein said means for gating further includes a NAND gate for generating control signals for controlling the transfer of said electrical signals to said means for storing, and said means for delaying is responsive to at least one of said coordination signals to provide an input to said NAND gate. ]

[ 6. Apparatus as in claim 5 wherein said means for delaying includes a holding circuit triggered by said coordination signals for providing an input signal to said second input. ]

[ 7. Apparatus as in claim 1 wherein said means for delaying provides a delay substantially equal to a time period required for the stabilization of the compression pressure of said cylinders. ]

[ 8. Apparatus as in claim 1 wherein said means for storing includes a storage device for storing the electrical signal for each cylinder of said engine, said electrical signals are fed to said storage devices, each of said storage devices including a control input, said means for gating further including a shift register responsive to said means for gating for generating a control signal for each of said storage devices during one complete starting cycle of said cylinders, whereby an electrical signal representative of the starting current of each of said cylinders is successively fed to a respective one of each of said storage devices. ]

[ 9. Apparatus as in claim 8 further comprising an electrical connection between that storage device last controlled in said one complete starting cycle and said means for gating, and the control signal to said last controlled storage device generates therefrom a feedback signal via said electrical connection to block said means for gating. ]

[ 10. Apparatus as in claim 1 further comprising first and second low pass filters for respectively filtering said electrical signals and said coordination signals. ]

*11. Apparatus for the determination of cylinder compression pressure of an internal combustion engine having a starter, by storage of signals representative of starter current and generating coordination signals from the ignition impulses of the engine, the apparatus comprising, a gating circuit having a first input for receiving signals corresponding to the ignition impulses of all cylinders of the engine, and a second input for receiving signals initiated by the ignition impulses from a selected engine cylinder;*

*means for storing said signals representative of starter current; and*

*said gating circuit passing to said means for storing said signals received by said first input only during presence of said signals received by said second input for actuating said means for storing.*

*12. Apparatus as in claim 11 wherein the signal representative of the starter current is the voltage drop in the ground line of the engine voltage source.*

*13. Apparatus as in claim 11 wherein said selected cylinder is the first cylinder of the engine.*

*14. Apparatus as in claim 11 wherein signals representative of the ignition impulses are obtained from the ignition cable associated with the engine cylinders.*

*15. Apparatus as in claim 11 wherein said gate circuit includes a NAND gate connected to the input for receiving ignition impulses from said selected engine cylinder for providing control signals to said means for storing.*

*16. Apparatus as in claim 15 further comprising means for shaping the signals representative of the ignition impulses of said selected engine cylinder.*

*17. Apparatus as in claim 11 further comprising means for delaying the storage of said signals for a time period required for stabilization of the compression pressures of said cylinders.*

*18. Apparatus as in claim 11 wherein said means for storing includes storage circuits and further comprising a shift register connected to the output of said gating circuit and providing outputs to each of said storage circuits.*

*19. Apparatus as in claim 18 wherein the storage circuit last triggered in an engine cycle is connected to an input of said gating circuit for blocking said gating circuit.*

*20. Apparatus as in claim 11 further comprising a low pass filter connected in each of the inputs of said gating circuit.*

* * * * *